United States Patent [19]

Kusaka

[11] Patent Number: 5,630,180
[45] Date of Patent: May 13, 1997

[54] CAMERA SYSTEM

[75] Inventor: Yosuke Kusaka, Yokohama, Japan

[73] Assignee: Nikon Corporation, Japan

[21] Appl. No.: 391,478

[22] Filed: Feb. 21, 1995

Related U.S. Application Data

[63] Continuation of Ser. No. 124,699, Sep. 22, 1993, abandoned.

[30] Foreign Application Priority Data

Sep. 25, 1992 [JP] Japan .................................. 4-256098

[51] Int. Cl.$^6$ .................................................. G03B 7/00
[52] U.S. Cl. ........................................ 396/63; 396/93
[58] Field of Search .................................. 354/400, 402, 354/21, 286, 432

[56] References Cited

U.S. PATENT DOCUMENTS

| | | | |
|---|---|---|---|
| 4,423,934 | 1/1984 | Lambeth et al. | 354/402 |
| 4,437,287 | 3/1984 | Fukuhara et al. | 354/409 |
| 4,477,164 | 10/1984 | Nakai et al. | 354/286 |
| 4,537,487 | 8/1985 | Taniguchi et al. | 354/286 |
| 4,602,861 | 7/1986 | Taniguchi et al. | 354/403 |
| 4,629,304 | 12/1986 | Saegusa | 354/432 |
| 4,897,683 | 1/1990 | Suzuki et al. | 354/400 |
| 4,903,055 | 2/1990 | Lourette et al. | 354/21 |
| 4,912,493 | 3/1990 | Tanaka | 354/400 |
| 4,959,728 | 9/1990 | Takahashi et al. | 354/286 |
| 4,978,981 | 12/1990 | Satoh et al. | 354/410 |
| 5,036,348 | 7/1991 | Kusaka | 354/402 |
| 5,274,416 | 12/1993 | Kawasaki et al. | 354/286 |
| 5,422,701 | 6/1995 | Utagawa | 354/406 |

FOREIGN PATENT DOCUMENTS 63-172110  7/1988  Japan .

*Primary Examiner*—Russell E. Adams

[57] ABSTRACT

An interchangeable lens camera including an interchangeable lens having a photographic optical system, a lens mount to mount the interchangeable lens, a lens side communication terminal to communicate, a storage circuit to store lens data representing an optical property of the photographic optical system of the interchangeable lens, and a lens side communication device to transmit the lens data stored in the storage circuit through the lens side communication terminal, and a camera body having a body mount engageable with the lens mount to mount the interchangeable lens on the camera body, a sensor to receive light from a field through the photographic optical system and to generate an output corresponding to the light received, a processing circuit to process the output generated from the sensor and to output a condition signal, based on the processed output, indicating a condition of a subject image formed by the photographic optical system, a body side communication terminal connected to the lens side communication terminal to communicate with the lens side communication terminal, a body side communication device to communicate with the lens side communication device, through the body side communication terminal and the lens side communication terminal, to receive the lens data transmitted from the lens side communication device, and a correction circuit to correct the condition signal based on the lens data.

19 Claims, 12 Drawing Sheets

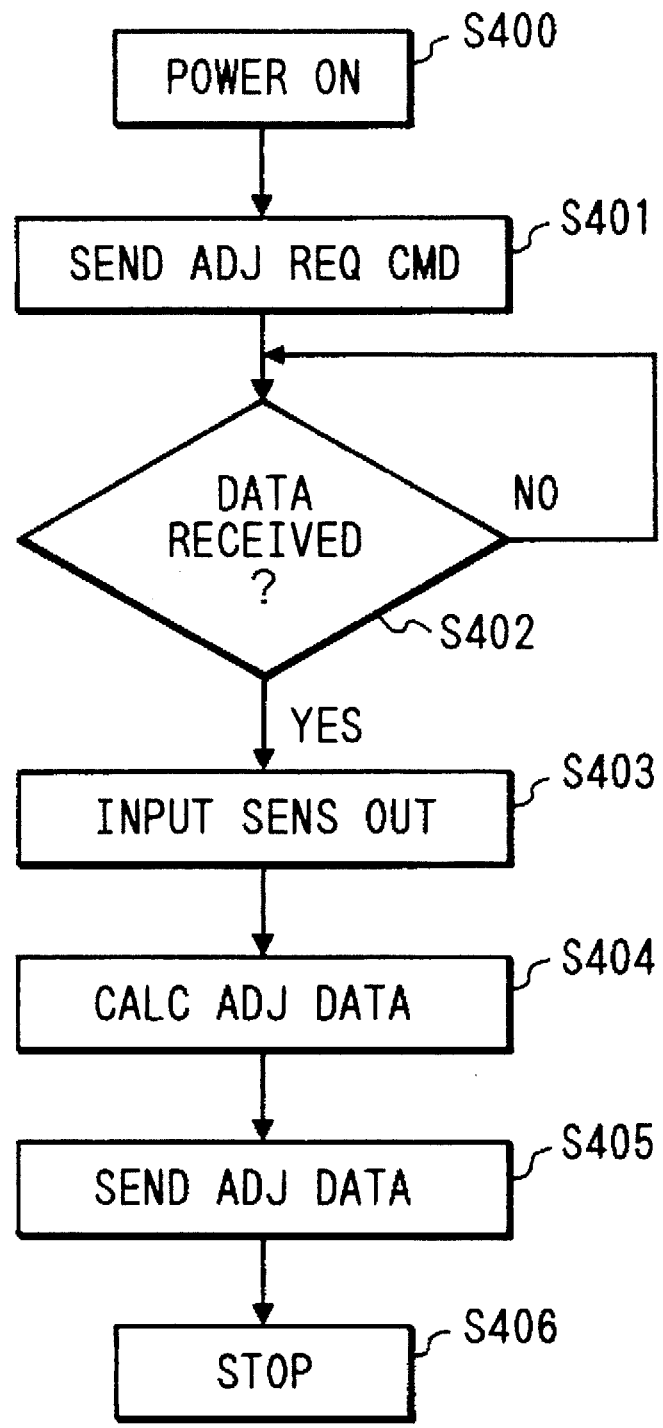

CAMERA SYSTEM

This is a continuation of application Ser. No. 08/124,699 filed Sep. 22, 1993, now abandoned.

BACKGROUND OF THE INVENTION

1. Field of the Invention

The present invention relates to an interchangeable lens camera system. More particularly, the invention relates to a camera system which can correct the focus detection and the photomerry in accordance with variations or changes with time in optical properties of interchangeable lenses.

2. Related Background Art

Conventionally known is an interchangeable lens camera system provided with a focus detecting apparatus which can detect a defocus amount between an imaging plane of photographic lens and a film plane by detecting phases of a pair of images formed by a pair of beams coming from two different regions in exit pupil of interchangeable lens. Also known is an interchangeable lens camera system provided with a focus detecting apparatus for carrying out the above focus detection at a plurality of positions in screen.

Such systems need to correct the defocus amount detected in accordance with various aberrations of lens, because an F-value of a beam forming an actual image is different from that of a beam for focus detection. The correction of defocus amount was carried out in the systems such that each interchangeable lens stored lens data according to designed aberrations thereof and that the lens data was read into the camera body for correction. In case that a focus detection position is off the optical axis, an image plane where the focus is detected is curved, so that there is a relative error between focus detection positions off and on the optical axis. Therefore, lens data for correction was calculated from designed aberrations in accordance with a distance to the optical axis and stored for each interchangeable lens. Lens data of each lens was read into the camera body for correction.

Another focus detection error, which was caused by a difference between the spectral property of film speed and the spectral property of sensor for focus detection, was also corrected in the arrangement in which each interchangeable lens stored lens data according to designed infrared aberrations thereof and in which the lens data was read into the camera body for correction.

Further, there is known another interchangeable lens camera system provided with a metering device for carrying out the photometry in screen through the interchangeable lens. In this system an interchangeable lens stores as lens data information on transmittance, F-value at full open aperture and exit pupil position thereof and the lens data is read into the camera body when a metering value is calculated from an output of the metering sensor.

The focus adjusting apparatus as described, however, had the following problems.

Since the lens data is common to all same interchangeable lenses, the conventional methods cannot absorb individual variations of optical properties such as aberrations caused by eccentricity of lens, a variation of lens spacing, a variation of index of refraction of lens, or the like, which could be produced in assembly of lenses; a spectral transmittance; an F-value at full open aperture; and an exit pupil position, inevitably making an error.

The individual variations of optical properties can be permissible only as to photography if they are within a certain range, but they cannot be always permissible for metering or focus detection. Mechanical adjustment could be conducted to cancel the variations of optical properties so as not to cause a final error in photometry or in focus detection, which requires a lot of time and costs.

In addition, the conventional methods failed to deal with not only a change in optical properties after an interchangeable lens is disassembled and then reassembled for repair, but also a change with time in optical properties due to environmental changes such as the temperature and the humidity. Thus, an error is inevitably made in focus detection or in photometry.

For example, if the focus detection is carried out at the center of screen using a focus detection optical system of split-pupil re-imaging method, a beam for focus detection is one with a large F-value relatively near the optical axis, but a beam for exposure upon open aperture photography is one with a small F-value. Thus, it is known that there is a difference H caused between the focus detection image plane P and the best image plane Q because of influence of spherical aberration A, as shown in FIG. 9. In FIG. 9 the vertical axis represents a height of incident light and the horizontal axis a position in the direction of optical axis, on which R is a position of Gaussian image plane.

The position of best image plane Q can be calculated by the following conventional method. Since the difference H between the two image planes as described above varies depending upon the type of lens, a value of difference H is preliminarily calculated from a designed spherical aberration and fixedly stored as lens data in mass production in a ROM built in each lens. When each lens is mounted on the camera body, the lens data is read from the lens into the body side. The position of focus detection image plane P detected is corrected by the difference H from the lens data to obtain the position of best image plane Q.

Lenses of the same type could have, however, an individual variation or a change with time of spherical aberration. For example, if the spherical aberration is as shown by A' in FIG. 9, the focus detection image plane is changed to P' and the best image plane to Q', whereby the difference therebetween is changed to H'. In case that the correction is made by the designed difference H ignoring this change, there would be an error H—H' between the best image plane Q' of lens and the calculated best image plane Q upon correction, as shown in FIG. 10.

Additionally, if the focus detection is carried out at the periphery of screen in the focus detection optical system of split-pupil re-imaging method, the difference H between the focus detection image plane P and the best image plane Q also changes into Hm (g) and Hs (g) depending upon a distance g to the optical axis because of the curvature of field, as shown in FIG. 11. In FIG. 11 the vertical axis represents a distance g to the optical axis and the horizontal axis is a distance in the direction of optical axis. Hm denotes an image plane difference when a focus detection region is located on a radial line with the center on the optical axis, and Hs an image plane difference when the focus detection region is located on a line perpendicular to the radial line.

The following method is known for correction of image plane difference. The above image plane difference is preliminarily calculated from optical design data for each lens type for example as coefficients in polynomials of distance g representing Hm (g) and Hs (g), or as values of image plane difference at predetermined distances g1 and g2. Then, the calculated image plane difference data is fixedly stored as lens data in mass production in a ROM built in lens. When a lens is mounted on the body, the stored lens data is read from the lens into the body. A position of focus detection image plane detected on the body side is corrected in accordance with the lens data, the focus detection position and the arrangement of detection regions. Then, the position of best image plane is calculated with the corrected value.

In FIG. 12 the vertical axis represents a distance to the optical axis and the horizontal axis a position in the direction of optical axis. A solid dot "•" stands for a position of corrected image plane when the focus detection region is located on a radial line, and a blank square "□" for a position of corrected image plane when the focus detection region is located on a line perpendicular to the radial line. Aligned on the vertical axis are positions of corrected image planes at distances X, O and —X to the optical axis.

Lenses of the same type could have, however, individual variations or changes with time of the above image plane differences Hm (g) and Hs (g). If a lens has eccentricity for example, the image plane differences become asymmetric with respect to the optical axis, as shown as Hm' (g) and Hs' (g) in FIG. 13. If the correction is carried out with the designed image plane differences Hm (g) and Hs (g) ignoring this change, errors Hm (g)–H'm (g) and Hs (g)–H's (g) will be made between the best image plane Q' of lens and the calculated best image plane Q after correction, as shown in FIG. 14. Therefore, the corrected image plane positions cannot be aligned at distances X, O and —X to the optical axis.

SUMMARY OF THE INVENTION

It is an object of the present invention to provide an interchangeable lens camera system which is free of errors in focus detection or in photometry even with individual variations or changes with time in optical properties of interchangeable lens.

BRIEF DESCRIPTION OF THE DRAWINGS

FIG. 21 is a flowchart to show the operation in an example in which a micon serves as a communication device 301 and an adjustment data calculation device 303 in an external unit 300 in FIG. 4.

DESCRIPTION OF THE PREFERRED EMBODIMENTS

The embodiments of the present invention will be described in detail with reference to the figures.

Figure 1:
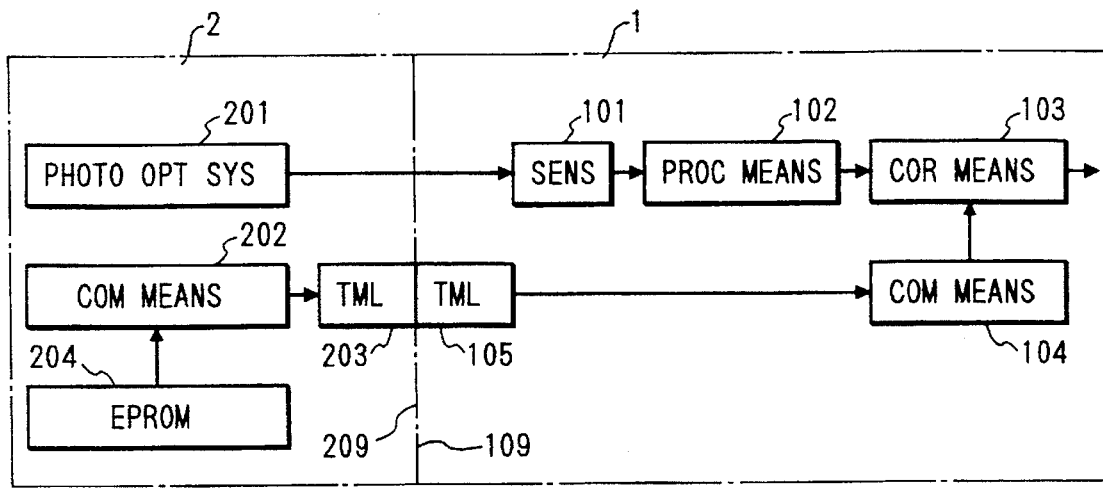
FIG. 1 is a drawing to show an embodiment.

In an embodiment of the present invention a camera system has the first structure as shown in FIG. 1, which comprises a camera body 1 and an interchangeable lens 2. The interchangeable lens comprises a photographic optical system 201 and a lens mount 209, a lens side communication terminal 203 for communication with the outside of lens, an electrically writable storage device 204 for storing lens data representing a property of the photographic optical system 201 different each from another individual of interchangeable lens 2, and a lens side communication device 202 for transmitting the lens data stored in the storage device 204 to the outside of lens through the lens side communication terminal 203. The camera body 1 comprises a body mount 109 engageable with the lens mount 209 for mounting the interchangeable lens 2 thereon, a sensor 101 for receiving light from field through the photographic optical system 201 and generating an output of received light when the interchangeable lens 2 is mounted on the camera body, a processing device 102 for calculation-processing the output of received light from the sensor 101 and outputting a condition signal to show a condition of subject image formed by the photographic optical system 202, a body side communication terminal 105 connected to the lens side communication terminal 203 upon mounting of the interchangeable lens 2 thereon, a body side communication device 104 for communication with the lens side communication device 202 through the body side communication terminal 105 and the lens side communication terminal 203 to receive the lens data transmitted from the lens side communication device 202, and a correction device 103 for correcting the condition signal based on the lens data.

Figure 2:
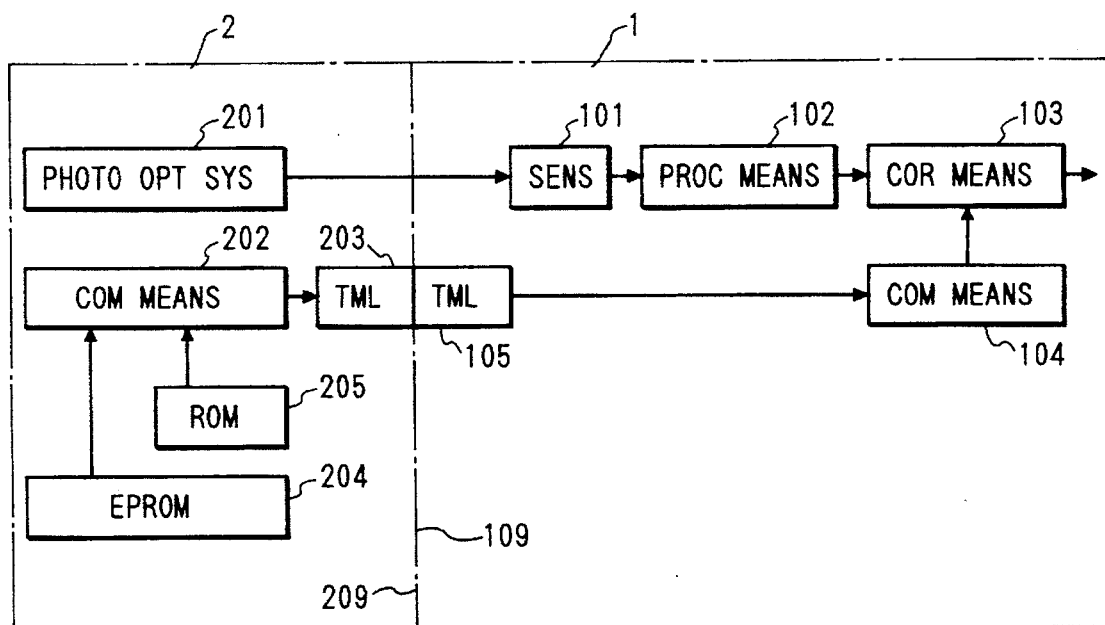
FIG. 2 is a drawing to show another embodiment.

In an embodiment of the present invention a camera system has the second structure as shown in FIG. 2, which comprises a camera body 1 and an interchangeable lens 2. The interchangeable lens 2 comprises a photographic optical system 201 and a lens mount 209, a lens side communication terminal 203 for communication with the outside of lens, a first storage device 205 for fixedly storing lens data representing a property of the photographic optical system 201 different each from another individual of interchangeable lens 2, a second electrically writable storage device 204 for storing adjustment lens data for adjusting a variation of property of the photographic optical system 201, and a lens side communication device 202 for transmitting the lens data stored in the first and second storage devices 204, 205 to the outside of lens through the lens side communication terminal 203. The camera body 1 comprises a body mount 109 engageable with the lens mount 209 for mounting the interchangeable lens 2 thereon, a sensor 101 for receiving light from field through the photographic optical system 201 and generating an output of received light when the interchangeable lens 2 is mounted on the camera body, a processing device 102 for calculation-processing the output of received light from the sensor 101 and outputting a condition signal to show a condition of subject image formed by the photographic optical system 202, a body side communication terminal 105 connected to the lens side communication terminal 203 upon mounting of the interchangeable lens 2 thereon, a body side communication device 104 for communication with the lens side communication device 202 through the body side communication terminal 105 and the lens side communication terminal 203 to receive the lens data transmitted from the lens side communication device 202, and a correction device 103 for correcting the condition signal based on the respective lens data.

Figure 3:
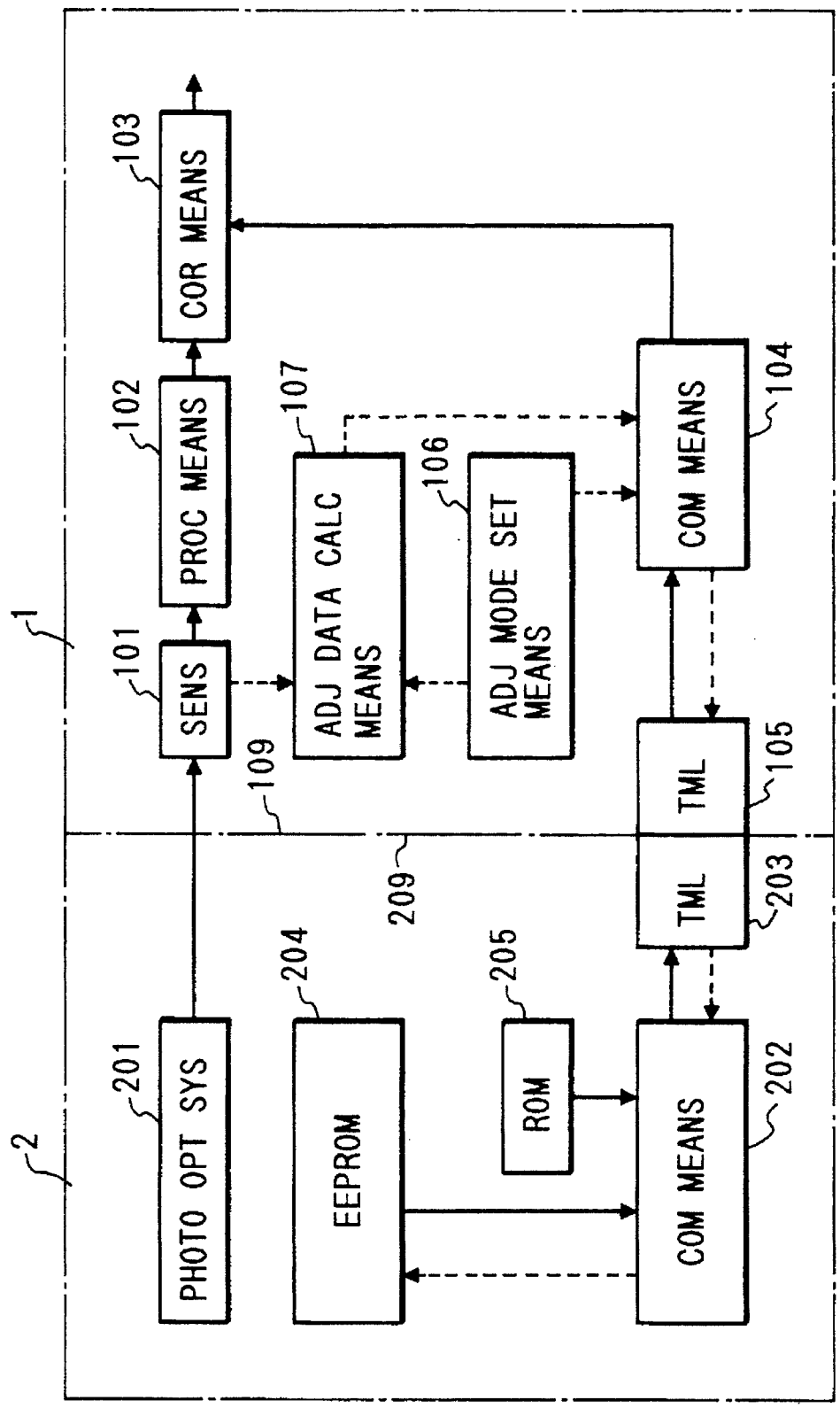
FIG. 3 is a drawing to show another embodiment.

In a further embodiment of the present invention a camera system has the third structure as shown in FIG. 3, in which the storage device 204 in FIG. 1 or in FIG. 2 is made electrically erasable and writable and in which the following additional devices are added to the structure in FIG. 1 or to the structure in FIG. 2. As shown in FIG. 3, the camera body 1 comprises an adjustment mode setting device 106 for setting an adjustment mode in which the camera body 1 carries out an adjustment operation different from the normal operation, and an adjustment data calculation device 107 for calculation-processing the output of received light from the sensor 101 upon mounting of the interchangeable lens 2 to produce adjustment data intrinsic to the interchangeable lens upon mounting thereof. When the adjustment mode is set by the adjustment mode setting device 106, the body side communication device 104 transmits the adjustment data to the lens side communication device 202 through the body side communication terminal 105 and the lens side communication terminal 203, and the lens side communication device 202 receives the adjustment data to write the adjustment data as lens data in the storage device 204 or in the second storage device 204 whale updating the memory.

Figure 4:
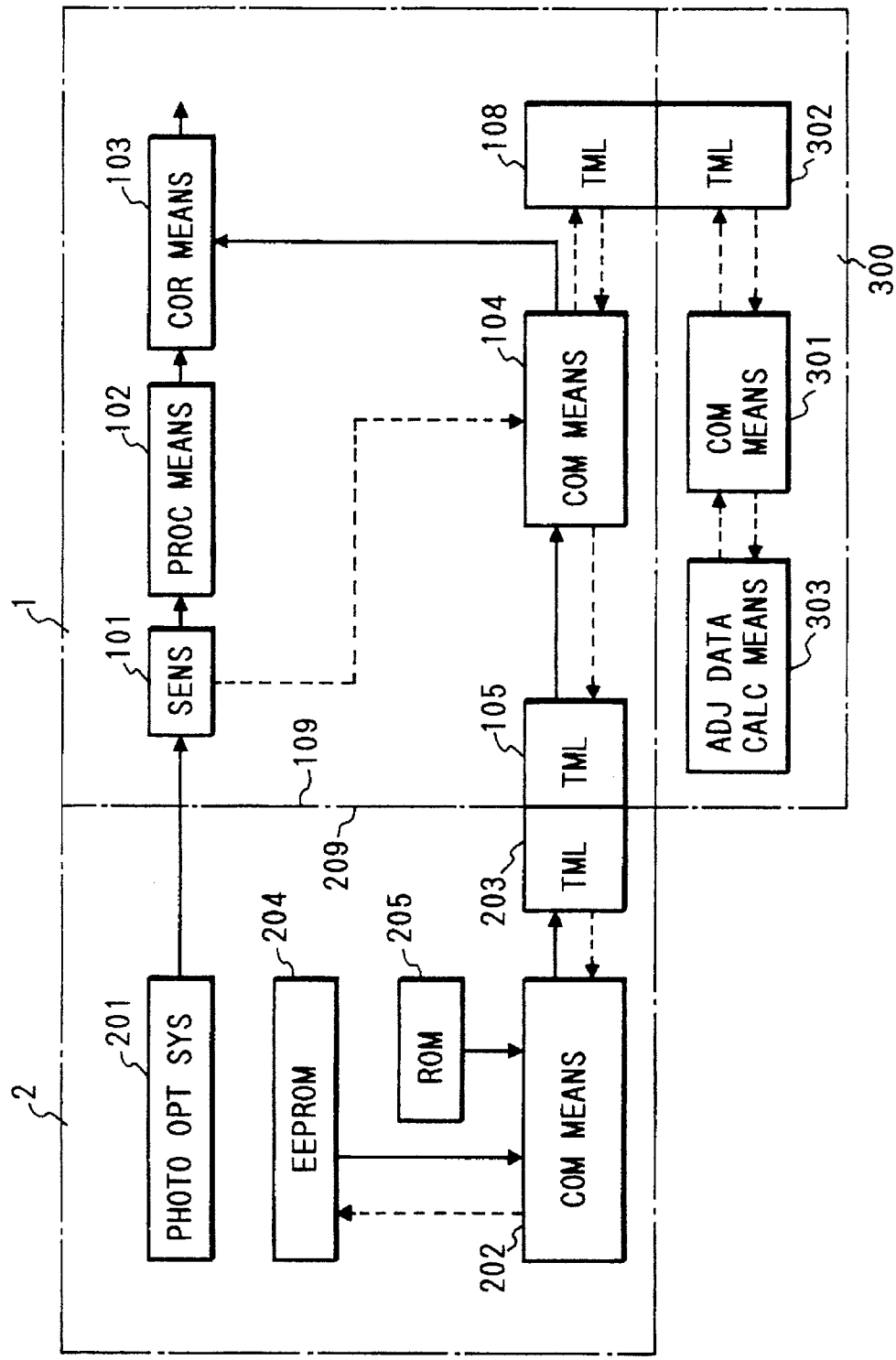
FIG. 4 is a drawing to show another embodiment.

In another embodiment of the present invention a camera system has the fourth structure as shown in FIG. 4, in which the storage device 204 in FIG. 1 or in FIG. 2 is made electrically erasable and writable and in which the following additional devices are added to the structure in FIG. 1 or to the structure in FIG. 2. The camera body 1 has an external communication terminal 108 for communication with the outside of the camera body 1, and the body side communication device 104 is capable of communicating with the outside through the external communication terminal 108. Further, an external unit 300 is provided outside the camera body 1, which comprises a unit side communication terminal 302 connected to the external communication terminal 108, a unit side communication device 301 for communication with the body side communication device 104 through the external communication terminal 108 and the unit side communication terminal 302 to receive output data of received light of the sensor 101 transmitted from the body side communication device 104, and an adjustment data calculating device 303 for calculation-processing the output data of received light of the sensor 101 to produce adjustment data intrinsic to the interchangeable lens upon mounting thereof. In the arrangement, the unit side communication device 301 transmits the adjustment data to the body side communication device 104 through the unit side communication terminal 302 and the external communication terminal 108, the body side communication device 104 transmits the adjustment data to the lens side communication device 202 through the body side communication terminal 105 and the lens side communication terminal 203, and the lens side communication device 202 receives the adjustment data to write the adjustment data as lens data in the storage device 204 or in the second storage device 204 while updating the memory.

In the present invention, the processing device 102 is focus detection means or metering means, and the correction device 103 is focus correction means for effecting the correction of focus detection on the focus detection means, or metering value correction means for effecting the correction of metering on the metering means.

Also in the present invention, the electrically writable storage device 204 is set on the lens side, and lens data including variations and changes with time of optical properties for each interchangeable lens 2 is written as the lens data in storage. The body side communication device 104 reads the above lens data transmitted from the lens side communication device 204 through the communication terminals 105, 203, and the body side correction device (focus correction means or metering value correction means) corrects a value of focus detection or metering based on the above lens data.

Accordingly, the correction device carries out the correction of focus detection or metering to cancel errors even with individual variations or changes with time of optical properties of interchangeable lens, whereby the aforementioned object of the invention can be achieved.

Still another embodiment of the present invention will be described in the following based on the figures.

Figure 5:
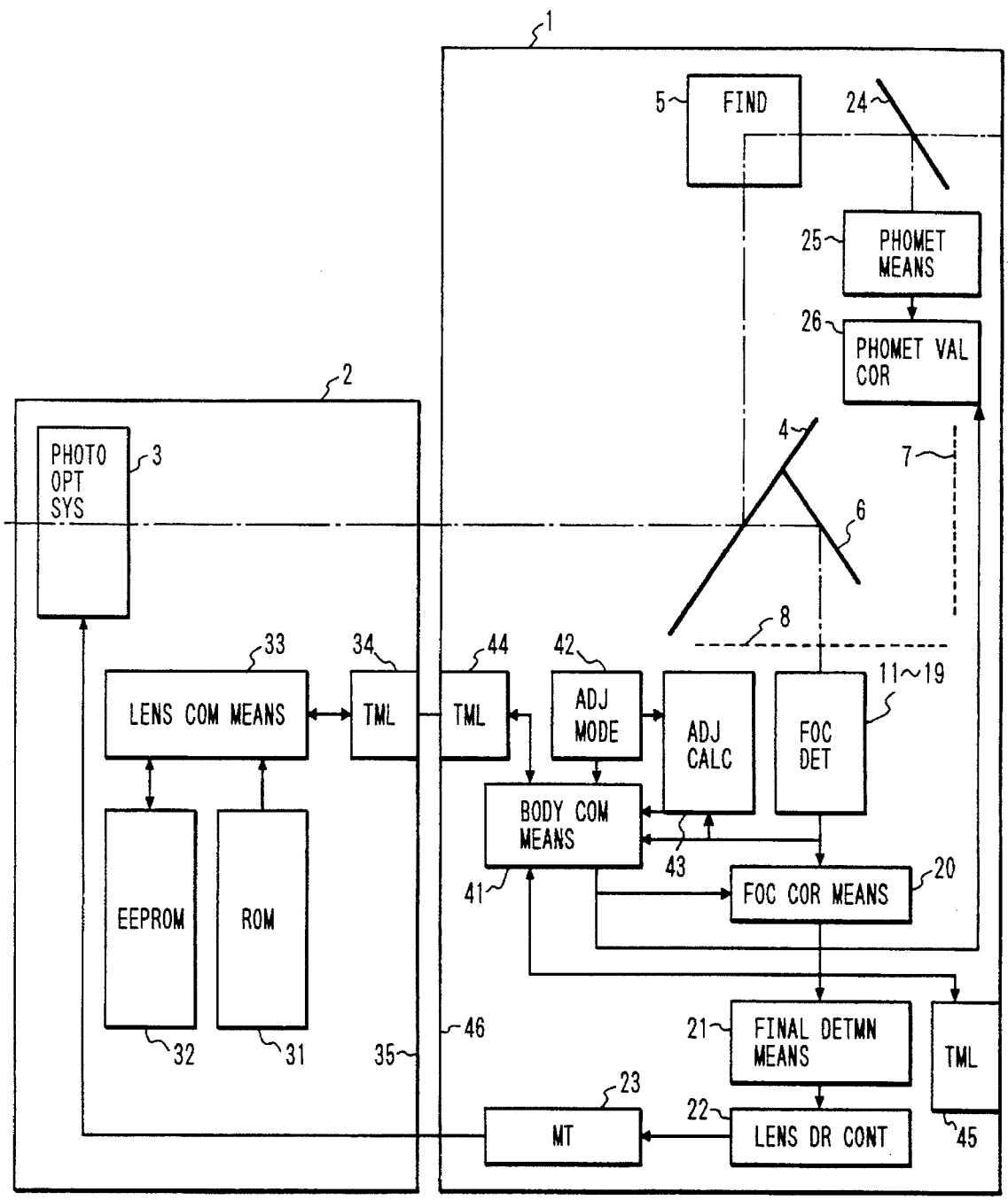
FIG. 5 is a block diagram to show the structure of an apparatus as an embodiment of the present invention.

FIG. 5 is a block diagram to show the structure of a camera system in an embodiment of the present invention. In FIG. 5 a lens 2 is constructed as interchangeable to a camera body 1. FIG. 5 shows a state in which the lens 2 is mounted on the camera body 1 through a lens mount 35 and a body mount 46.

A photographic optical system 3 is arranged inside the lens 2. Further, the lens 2 includes a ROM 31 which fixedly stores various information pieces (such as a focal length, an F-value at full open aperture, and a conversion factor for converting a defocus amount into a lens drive amount) on the photographic optical system 3 necessary for focus detection and photometry, an EEPROM (electrically erasable programmable read only memory) 32 which stores optical properties intrinsic to the photographic optical system 3 and which can be rewritten, a lens communication device 33 for communication with the body 1, and a lens side communication terminal 34 disposed at the lens mount 35.

A beam from a subject passing through the photographic optical system 3 is split into two by a main mirror 4 in the camera body 1, one toward a finder 5 and the other toward a submirror 6.

A half mirror 24 is disposed in a finder optical path on the right side of finder 5 in FIG. 5. The beam guided by the main mirror 4 into the finder 5 is split into two by the half mirror 24, one toward an eye piece optical system and the other toward a metering device 25. The metering device 25 is comprised of a metering optical system and a plurality of photosensors. The plural photosensors receive the beam split by the half mirror 24 to measure a luminance distribution of subject and then to produce metering values in luminance distribution. A metering value corrector 26 corrects the metering values in luminance distribution as will be described hereinafter.

The beam deflected by the submirror 6 toward the bottom of body is guided to a plurality of focus detectors 11–19 disposed on an intended focal plane 8 of photographic optical system 3 conjugate with a plane on which a film 7 is located.

The focus detectors 11–19 are constructed as can detect a focus condition of subject image at plural locations on screen. The focus detectors photoelectrically convert the subject image into signals of subject image corresponding to an intensity distribution thereof. Each focus detector at a focus detection position processes a subject image signal to calculate a defocus amount between the intended focal plane 8 and the subject image plane formed by the photographic optical system 3 thereat. A focus corrector 20 corrects the defocus amounts detected by the focus detectors 11–19 at the plurality of locations on screen.

A final determination device 21 determines a final defocus amount from the thus corrected defocus amounts. For example, in case one of the focus detectors 11–19 is selected by an unrepresented operation device, a corrected defocus amount from the selected focus detector is determined as a final defocus amount. In case that a plurality of photodetectors are selected by the operation device, a defocus amount showing the closest among corrected defocus amounts from the selected photodetectors or an average of corrected defocus amounts may be determined as a final defocus amount. In case only one focus detector is provided in camera, the final determination device 21 is unnecessary.

A lens drive controller 22 controls a drive direction and a drive amount of motor 23, based on the thus determined defocus amount.

The motor 23 is mechanically connected with the photographic optical system 3 in lens. A drive amount and a drive speed of motor 23 are controlled to move the photographic optical system 3 to the in-focus position.

The body 1 encloses a body communication device 41 for communication with the lens, and a body side communication terminal 44 disposed at the body mount 46. Various information pieces (such as a focal length, an F-value at full open aperture, and a conversion factor for conversion from a defocus amount to a lens drive amount) necessary for focus detection and photometry and information pieces on optical properties intrinsic to the photographic optical system 3 are exchanged between the body and the lens through the communication terminals 34, 44 on the lens side and on the body side.

There are a communication terminal 45 for communication with an external accessary other than the camera body 1 and the lens 2, an adjustment mode setting device 42 for change-over between an adjustment mode and a normal mode as described later, and an adjustment calculation device 43 for calculating adjustment data as also described later, also provided in the camera body 1.

Figure 6:
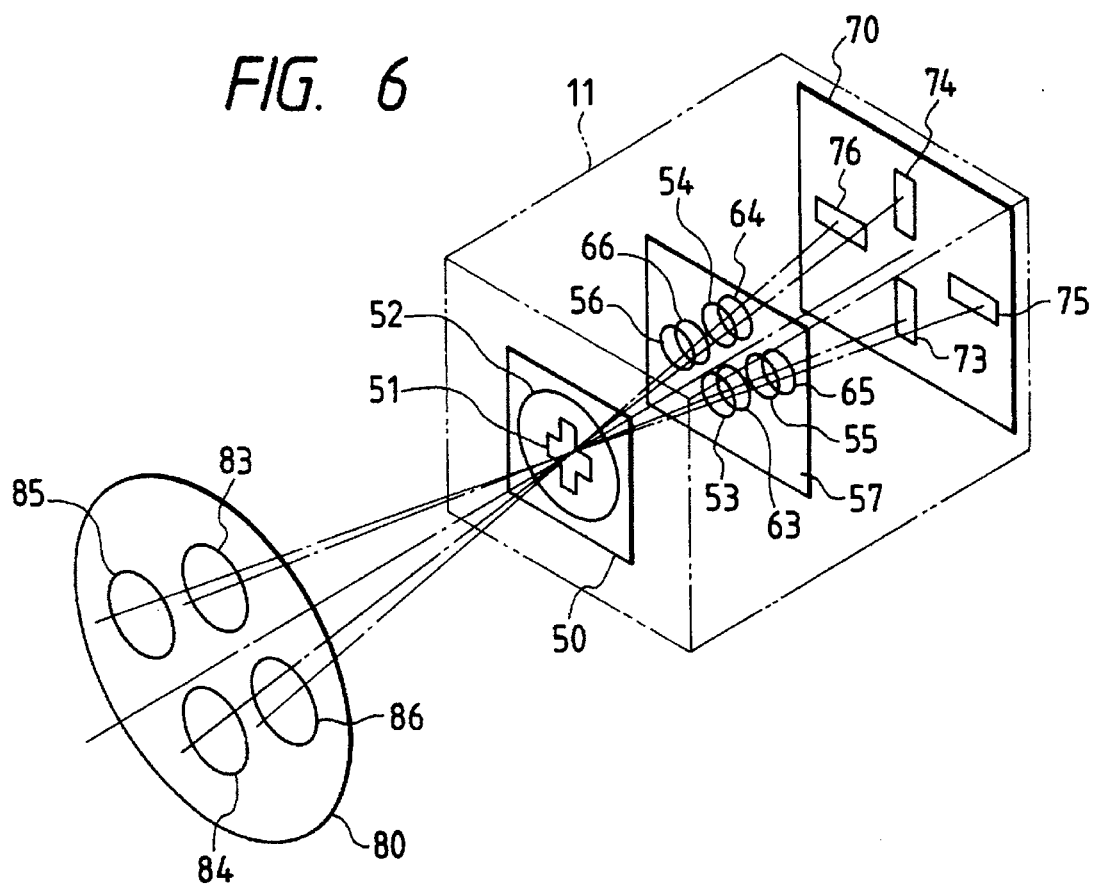
FIG. 6 is a perspective view to show the structure of a focus detecting device.

FIG. 6 is a perspective view to show an example of construction of the focus detector 11 in FIG. 5. The other focus detectors 12–19 are also constructed in the same manner, and therefore only the focus detector 11 is explained below.

In FIG. 6, the focus detector 11 is composed of a field mask 50 having a cross-shaped aperture 51, a condenser lens 52, a stop mask 57 having two pairs of stop apertures 53, 54, 55, 56, a focus detection optical system composed of two pairs of re-imaging lenses 63, 64, 65, 66, and a sensor 70 such as the CCD having two pairs of photo receptors 73, 74, 75, 76. The focus detector 11 re-images a primary image formed by the photographic optical system 3 in FIG. 5 to form two pairs of secondary images on the two pairs of photo receptors 73, 74, 75, 76. Each of the photo receptors 73, 74, 75, 76 is composed of a plurality of pixels.

The aperture 51 of field mask 50 is disposed in the vicinity of the intended focal plane 8 in FIG. 5, so that a focus detection position is set on the screen.

The two pairs of stop apertures 53, 54, 55, 56 are projected by a condenser lens 52 onto two pairs of regions 83, 84, 85, 86 symmetric with each other with respect to the optical axis of the plane 80 near the exit pupil of photographic optical system 3. Thus, a beam passing through one of this region first forms a primary image near the field mask 50. The primary images pass through the condenser lens 52 and the two pairs of stop apertures 53, 54, 55, 56 to form two pairs of secondary images on the two pairs of photo receptors 73, 74, 75, 76 of sensor 70 through the two pairs of re-imaging lenses 63, 64, 65, 66.

An intensity distribution of each of the two pairs of secondary images is photoelectrically converted by each photo receptor 73, 74, 75, 76 into an electric subject image signal.

A defocus amount can be detected between the imaging plane of photographic optical system 3 and the intended focal plane 8 by detecting a relative positional relation in the alignment direction of a pair of photo receptors between a pair of secondary images on the sensor 70, using subject image signals produced by the sensor 70 in the conventional procedure. The focus detector 11 produces two defocus amounts for vertical direction and horizontal direction.

Figure 7:
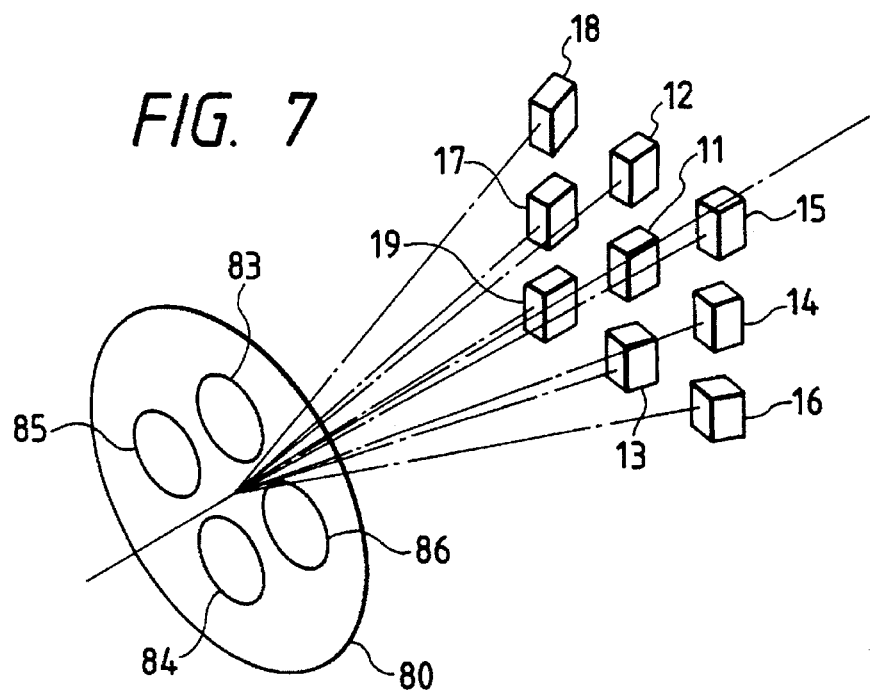
FIG. 7 is a perspective view to show a positional relation of focus detecting devices.

The other focus detectors 12–19 are constructed in the same manner as the focus detector 11 as described in the state that the focus detectors 11–19 are located on the intended focal plane 8 as shown in FIG. 7. Each of focus detectors 11–19 forms two pairs of subject images with beams from two pairs of regions 83, 84, 85, 86 symmetric with each other to the optical axis of the plane 80 near the exit pupil of photographic optical system 3, and detects a relative positional relation between the subject images to calculate defocus amounts at each focus detection position on the screen.

Figure 8:
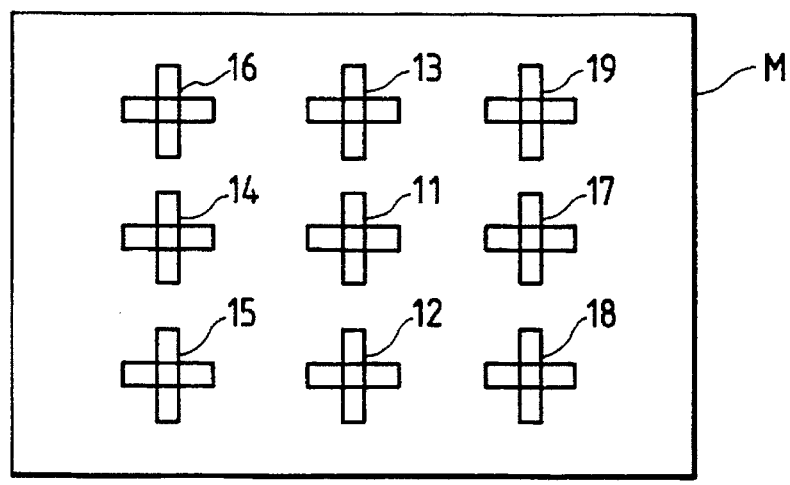
FIG. 8 is a plan view to show a positional relation of focus detection positions.
Figure 9:
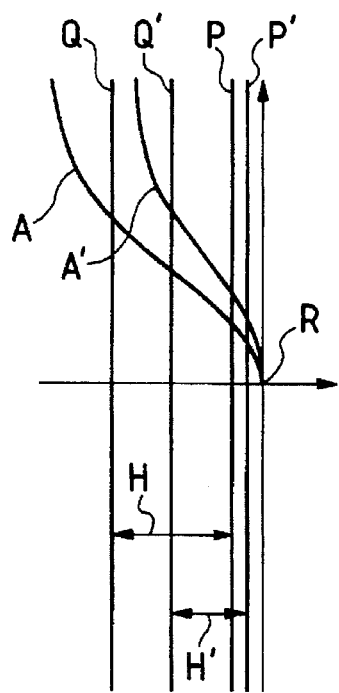
FIG. 9 is a drawing to illustrate a change of difference between focus detection image plane and best image plane because of spherical aberration.
Figure 10:
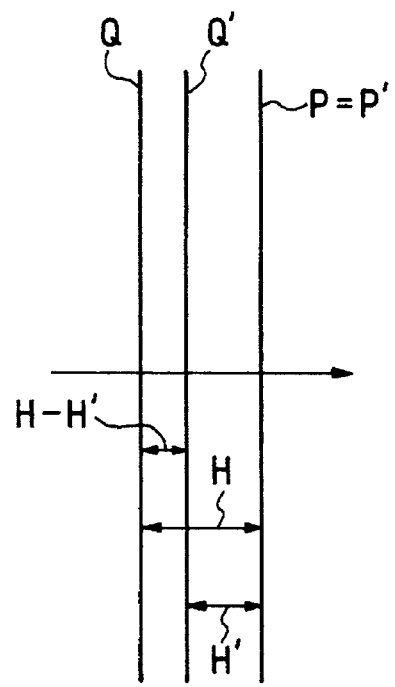
FIG. 10 is a drawing to illustrate that an error of difference between focus detection image plane and best image plane is caused to a designed value by lens individual variation in spherical aberration.
Figure 11:
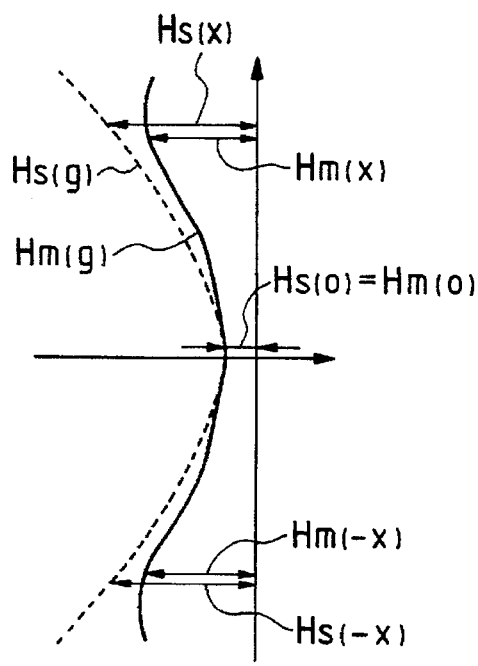
FIG. 11 is a drawing to illustrate a change of difference between focus detection image plane and best image plane depending upon a focus detection direction and an image height.

FIG. 8 is a drawing to show focus detection positions on screen M corresponding to the locations of focus detectors 11–19 in FIG. 7.

The above structure is substantially the same as the structure shown in FIG. 3 except for the external terminal 45 in FIG. 5. The following describes the correspondence between the components in FIG. 3 and the components in FIG. 5.

The lens side EEPROM (the second storage device) 204 in FIG. 3 corresponds to the EEPROM 32 in FIG. 5. Also, the ROM (the first storage device) 205 in FIG. 3 corresponds to the ROM 31 in FIG. 5. Further, the sensor 101 in FIG. 3 consists of the plural photosensors in the metering device 25 and the sensors 70 in focus detectors 11-19 in FIG. 5. As described above, the processing device 102 in FIG. 3 consists of the plural photosensors in metering device 25 for producing the luminance distribution value of subject and the photodetectors 11-19, and the correction device in FIG. 3 consists of the metering value correction device 26 and the focus correction device 20 in FIG. 5.

The final determination device 21 in FIG. 5 is unnecessary with a single photodetector, as described above. Therefore, the final determination device 21 is not indispensable in the present invention.

Next described is the operation carried out when the normal mode is set by the adjustment mode setting device 42.

With a beam passing through the photographic optical system 3 in interchangeable lens 2, the focus detectors 11-19 detect defocus amounts (d1h, d1v, d2h, . . . , d9v) between the imaging plane of photographic optical system 3 and the intended focal plane 8 at the focus detection positions on the screen in FIG. 8 (in the vertical and horizontal directions to obtain eighteen values in total). "d1h" represents a defocus amount obtained by the focus detector 11 in the horizontal direction (in the longitudinal direction of screen) and "d1v" a defocus amount by the focus detector 11 in the vertical direction (in the direction of shorter side of screen).

Preliminarily stored in the lens side EEPROM 32 are differences H1h, H1v, H2h, . . . , H9v between focus detection image plane and best image plane intrinsic to the photographic optical system 3 in correspondence with focus detection position and direction of focus detectors 11-19. "H1h" represents an image plane difference by the photodetector 11 in the horizontal direction (in the longitudinal direction of screen) and "H1v" an image plane difference by the focus detector 11 in the vertical direction (in the direction of shorter side of screen).

The lens communication device 33 reads out from the EEPROM 32 the lens data H1h, H1v, H2h, . . . , H9v for image plane difference adjustment, each of which shows an image plane difference, and transmits the lens data to the body communication device 41 through the lens side communication terminal 34 and the body side communication terminal 44. The body communication device 41 transmits the lens data to the focus correction device 20.

The focus correction device 20 corrects the defocus amounts d1h, d1v, d2h, . . . , d9v detected by the focus detectors 11-19 at the focus detection positions on screen (eighteen values in total in the vertical and horizontal directions) by the image plane difference adjustment lens data H1h, H1v, H2h, . . . , H9v to produce corrected defocus amounts d1h', d1v', d2h',. . . , d9v' (d1h'=d1h−H1h, . . . ).

The final determination device 21 determines a final defocus amount which is a defocus amount to show the closest (the largest defocus amount) among the corrected defocus amounts d1h', d1v', d2h', . . . , d9v'.

The lens drive control device 22 determines a lens drive amount and a direction of photographic optical system 3 in accordance with the thus determined final defocus amount and drive-controls the motor 23 based on the determination to move the photographic optical system 3 to the in-focus position.

Although the above operation is described for setting of normal mode, this operation is applicable to the structure in FIG. 1.

Next described is the operation carried out when the adjustment mode is set by the adjustment mode setting device 42.

Figure 15:
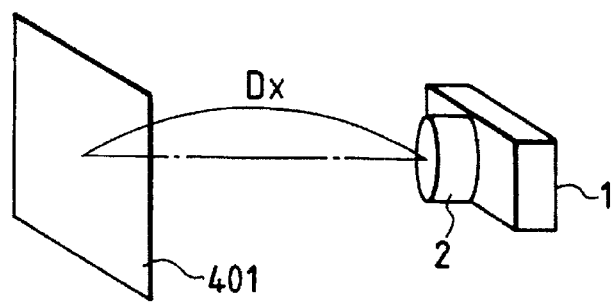
FIG. 15 is a drawing to show the setting of a camera and an adjustment chart in adjustment mode.
Figure 16:
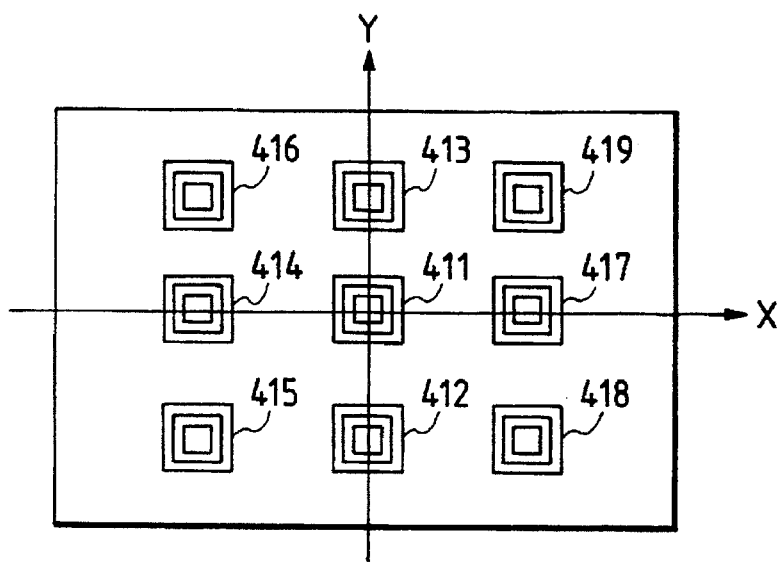
FIG. 16 is a drawing to show the structure of adjustment chart.

In the adjustment mode, as shown in FIG. 15, the camera body 1 and the interchangeable lens 2 are set to face the adjustment chart 401 at a predetermined distance DX. The adjustment chart 401 has adjustment patterns 411-419 as shown in FIG. 16 at positions corresponding to the focus detection positions on screen of focus detectors 11-19. The relative positions between the adjustment patterns are determined such that the focus detectors 11-19 catch the adjustment patterns 411-419 at the distance DX. The distance DX or the adjustment patterns must be changed depending upon the focal length of interchangeable lens.

When the focus adjustment is properly carried out in this state, it is ideal that the corrected defocus amounts d1h', d1v', d2h',. . . , d9v' all become 0, because a plain subject normal to the photographic optical axis is focus-detected. Actually, the defocus amounts d1h, d1v, d2h, . . . , d9v detected by the focus detectors 11-19 at the focus detection positions on screen are not 0 even in the ideal condition because of the optical properties intrinsic to the photographic optical system 3. Therefore, the defocus amounts d1h, d1v, d2h, . . . , d9v in this condition are equivalent to the image plane difference adjustment lens data H1h, H1v, H2h, . . . , H9v for making the corrected defocus amounts d1h', d1v', d2h', . . . d9v' all 0.

The focus adjustment of lens 2 to the adjustment chart 401 may be carried out such that a finder image is detected by an image sensor and the focus is adjusted to make the contrast of video signal of image sensor maximum. Alternatively, focusing can be simply done under visual observation of finder image.

In such a state, the adjustment calculation device 43 receives sensor outputs from the focus detectors 11'19 to execute the same focus detection calculation as the focus detectors 11-19 to calculate the aforementioned image plane difference adjustment lens data H1h, H1v, H2h, . . . , H9v equivalent to the defocus amounts d1h, d1v, d2h, . . . , d9v at the focus detection positions on screen. In this case, the adjustment calculation device 43 may be arranged to directly receive the defocus amounts d1h, d1v, d2h, . . . , d9v at the focus detection positions from the focus detectors 11-19.

The adjustment calculation device 43 transmits the above image plane difference adjustment lens data H1h, H1v, H2h, . . . , H9v to the body communication device 41, and the body communication device 41 transmits the lens data to the lens communication device 33 through the body side communication terminal 44 and the lens side communication terminal 34. The lens communication device 33 writes the above lens data H1h, H1v, H2h, . . . , H9v as lens data for image plane difference adjustment in EEPROM 32 while updating the memory.

Figure 18:
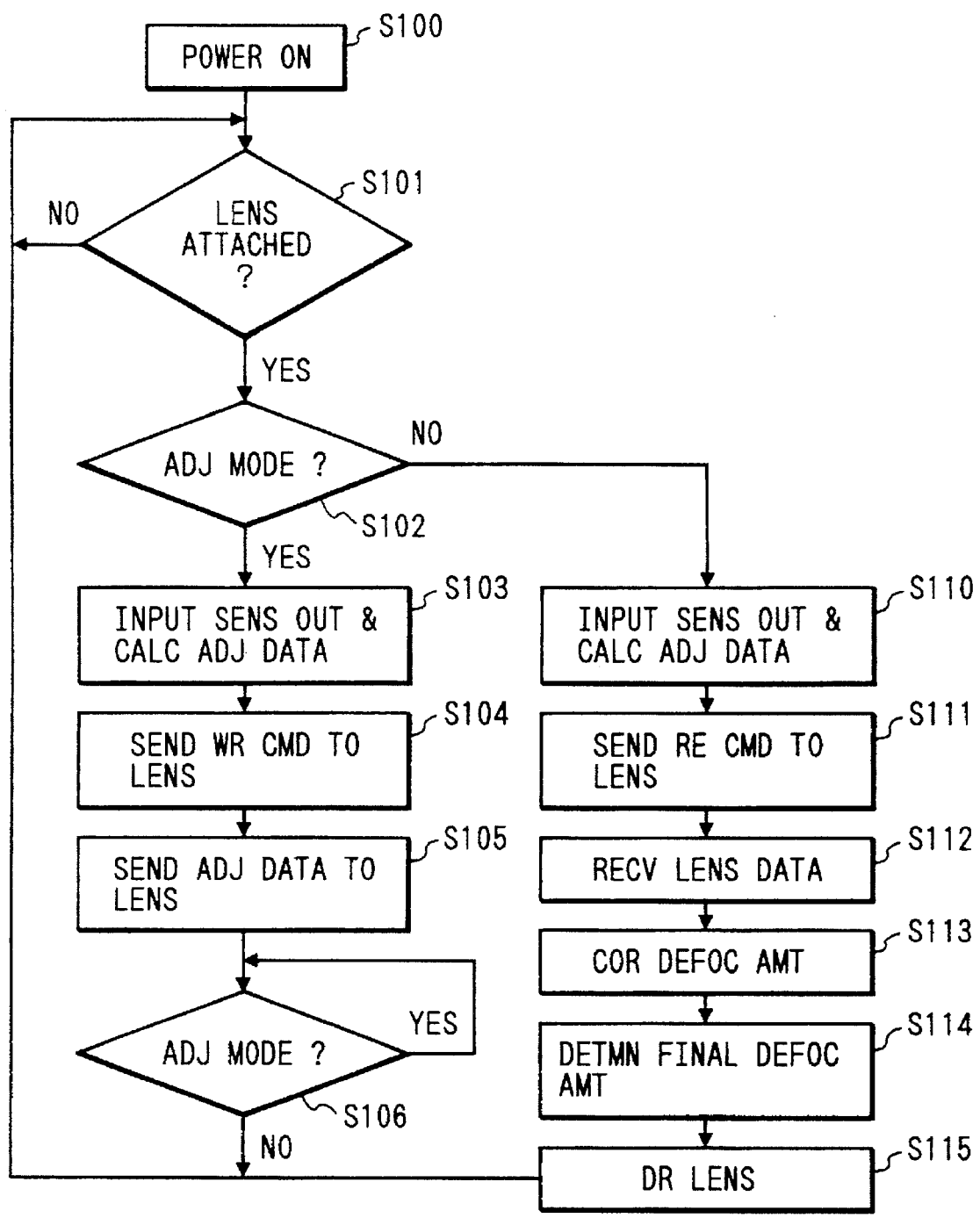
FIG. 18 is a flowchart to show the operation of a micon which serves as focus detection devices 11–19, an adjustment calculation device 43, a body side communication device 41, a focus correction device 20, a final determination device 21 and a lens drive control device 22 in FIG. 5.

FIG. 18 is a flowchart to show the operation in the arrangement in which a single micon serves as the body side focus detectors 11-19, the adjustment calculation device 43, the body communication device 41, the focus correction device 20, the final determination device 21 and the lens drive control device 22 in FIG. 5. The operation is described in detail with this flowchart.

In the beginning, the flow goes from Step S100 to Step S101 when the power of camera body 1 is turned on. At Step S101 the body side communication device 41 checks a condition of lens mount. If a lens is mounted then the flow goes to Step S102; unless mounted Step S1Q1 is repeated to await lens mounting.

At Step S102 the communication device 41 checks whether the adjustment mode is set by the adjustment mode setting device 42. If the adjustment mode is set then the flow goes to Step S103; if the normal mode is set then to Step S110.

At Step S103 the adjustment calculation device 43 reads the sensor outputs of focus detectors 11–19 to calculate the lens data H1h, H1v, H2h, . . . , H9v for image plane difference adjustment.

At Step S104 the body side communication device 41 transmits a writing command to the lens 2. At Step S105 the above-described image plane difference adjustment lens data H1h, H1v, H2h, . . . , H9v are transmitted through the body side communication device 41 to the lens 2.

At Step S106 the communication device 41 checks whether the adjustment mode is released by the adjustment mode setting device 42. If the adjustment mode is released then the flow returns to S101; unless released Step S106 is repeated to await the release.

At Step S110 the adjustment calculation device 43 reads the sensor outputs of focus detectors 11–19 to calculate defocus amounts (d1h, d1v, d2h, . . . , d9v).

At Step S111 the body side communication device 41 transmits a reading command to the lens 2. At Step S112 the body side communication device 41 receives the image plane difference adjustment lens data H1h, H1v, H2h, . . . , H9v from the lens 2.

At Step S113 the focus correction device 20 corrects the defocus amounts (d1h, d1v, d2h, . . . , d9v) by the image plane difference adjustment lens data H1h, H1v, H2h, . . . , H9v to calculate corrected defocus amounts (d'1h, d'1v, d'2h, . . . , d'9v).

At Step S114 the final determination device 21 chooses a corrected defocus amount to show the closest out of the corrected defocus amounts (d'1h, d'1v, d'2h, . . . , d'9v) to determine it as a final defocus amount.

At Step S115 the lens drive control device 22 drive-controls the motor 23 based on the final defocus amount to drive the photographic optical system 3 to the in-focus point. Then, the flow returns to Step S101.

Since the operation of from Step S110 to Step S115 as described is carried out when the normal mode is set, the system as constructed in FIG. 1 can also employ the same operation from Step S110 to Step S115.

Figure 19:
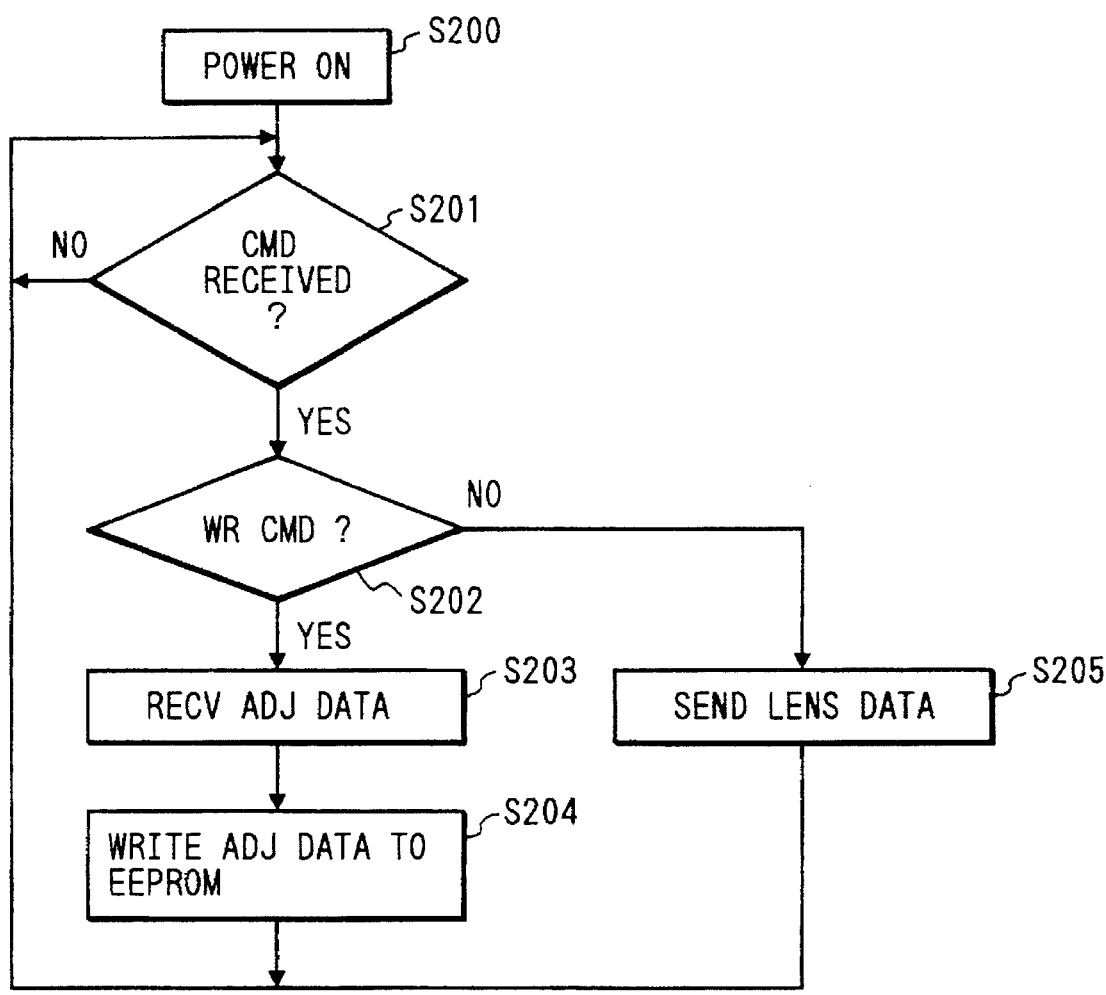
FIG. 19 is a flowchart to show the operation of an example in which a micon serves as a lens side communication device 33 in FIG. 5.

FIG. 19 is a flowchart to show the operation in the arrangement in which a micon serves as the lens communication device 33 on the lens side.

At Step S200 the power of camera body 1 is turned on to activate the lens side communication device 33 through the communication terminals 44, 34, and then the flow goes to Step S201.

At Step S201 the communication device 33 awaits a command from the body 1 based on Step S104 or Step S111 in FIG. 18. If a command is received, the flow goes to Step S202.

At Step S202 it is checked whether the command sent from the body 1 is a writing command or a reading command. If it is a writing command the flow goes to Step S203; if it is a reading command then to Step S205.

At Step S203 the communication device 33 receives the image plane difference adjustment lens data H1h, H1v, H2h, . . . , H9v transmitted from the body 1 based on Step S105 in FIG. 18.

At Step S204 the image plane difference adjustment lens data H1, H1v, H2h, . . . , H9v is written into EEPROM 32, and then the flow returns to Step S201 to await a next command.

At Step S205 the image plane difference adjustment lens data H1, H1v, H2h, . . . , H9v is read out from the EEPROM 32 and sent to the body 1. After that, the flow returns to Step S201 to await a next command. By above Step S205, the body side receives the above lens data from the lens side based on Step S112 in FIG. 18. After that, the body side is operated in the same manner as in the steps to follow Step 113.

In the above description, the adjustment calculation device 43 on the body 1 side calculates the image plane difference adjustment lens data H1h, H1v, H2h, . . . , H9v and sends the data to the lens 2 in the adjustment mode based on Step S103 and Step S105 in FIG. 18. Another embodiment may be arranged such that the communication device 41 on the body 1 side sends the sensor outputs from the focus detectors 11–19 through the external communication terminal 45 to the external unit 300 in FIG. 4 and that the device 300 calculates the image plane difference adjustment lens data and again send the adjustment lens data to the body 1 to further sends the data to the lens 2 to write it in EEPROM 32.

In more detail, the unit side communication device 301 in FIG. 4 receives the sensor output data transmitted from the body side communication device 41 in FIG. 5 through the external communication terminal 45 of camera body 1 shown in FIG. 5 and the unit side communication terminal 302 in FIG. 4, the adjustment data calculation device 303 in FIG. 4 calculates adjustment data with the received output data, and the unit side communication device 301 transmits the adjustment data to the body side communication device 41 in FIG. 5 through the communication terminals 302, 108 (or the communication terminal 45 in FIG. 5).

The communication device 41 transmits the above adjustment data to the lens side communication device 33 through the communication terminals 44, 34. The lens side communication device 33 receives the adjustment data to write the adjustment data as lens data in EEPROM 32 while updating the memory.

As so arranged, each body does not have to have an own adjustment calculation device 43, which simplifies the structure of body and which is advantageous in production cost.

Figure 20:
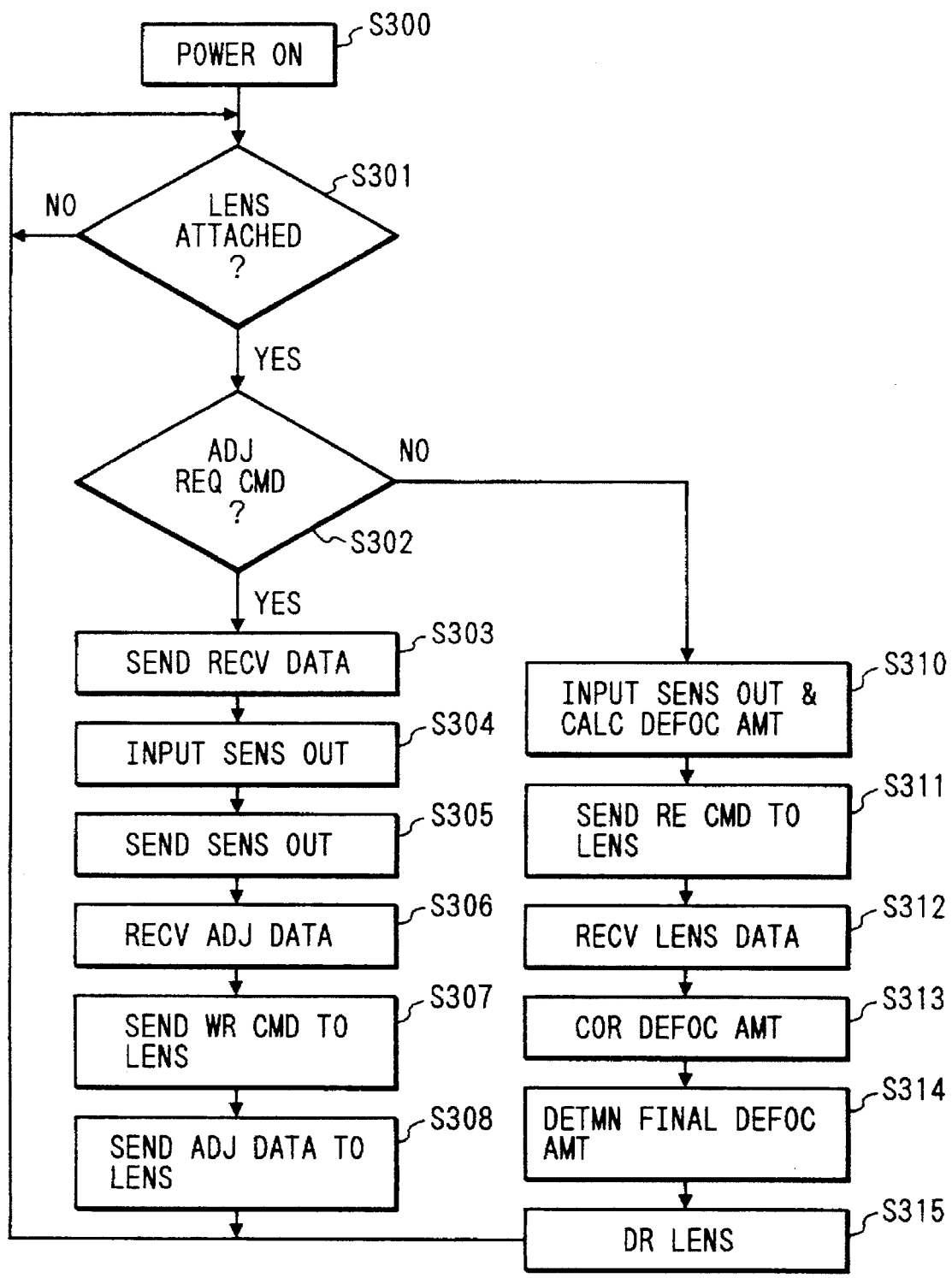
FIG. 20 is a flowchart to show the operation in an example with additional external unit 300 in FIG. 4 in which a micon serves as focus detection devices 11–19, a body side communication device 41, a focus correction device 20, a final determination device 21 and a lens drive control device 22 in FIG. 5.

FIG. 20 is a flowchart to show the operation in the arrangement with addition of the external unit 300 in which a micon serves as the focus detectors 11–19, the body communication device 41, the focus correction device 20, the final determination device 21 and the lens drive control device 22 on the body 1 side.

In FIG. 20, when the power on the camera body 1 side is turned on at Step S300, the flow goes to Step S301. At Step S301 the body communication device 41 checks whether a lens is mounted. If mounted then the flow goes to Step S302; unless mounted Step S301 is repeated to await lens mounting.

At Step S302 it is checked whether an adjustment request command is received from the external unit 300. If the adjustment is requested with the power of device 300 being on, the flow goes to Step S303. Unless the adjustment is requested with the power of device 300 being off, the flow goes to Step S310.

At Step S303 the body side communication device 41 transmits to the external unit 300 acceptance data which shows that a request of adjustment is received by the external unit 300. At Step S304 the communication device 41 reads the sensor outputs of focus detectors 11–19. Then the flow goes to Step S305, where the communication device 41 transmits the sensor outputs to the external unit 300.

At Step S306 the body side communication device receives the image plane difference adjustment lens data H1h, H1v, H2h, ..., H9v from the external unit 300.

At Step S307 the body side communication device 41 transmits a writing command to the lens 2, and the. flow goes to Step S308 to transmit the image plane difference adjustment lens data H1h, H1v, H2h, ..., H9v to the lens 2. After that, the flow returns to S301.

Steps S310 to S315 show the operation executed if the adjustment is not requested with the power of external unit 300 being off, which is the same operation as at Steps S110 to S115 in FIG. 18 executed when the normal mode is set. The details of the steps are omitted to explain herein.

FIG. 21 is a flowchart to show the operation in the arrangement in which a micon serves as the communication device 301 and the adjustment data calculation device 303 in the external unit 300.

At Step S400 the power of external unit 300 is turned on, and then the flow goes to Step S401. At Step S401 the communication device 301 transmits an adjustment requested command to the body 1 through the communication terminals 302, 108. At Step S402 the communication device 301 awaits acceptance data of requested adjustment from the body 1 based on Step 303 in FIG. 20. If the acceptance data is sent and received by the communication device 301, the flow goes to Step S402.

At Step S403 the communication device 301 receives the sensor outputs sent from the body 1 based on Step 305 in FIG. 20. At Step S404 the adjustment data calculation device 303 calculates image plane difference adjustment lens data H1h, H1v, H2h,..., H9v based on the sensor outputs.

At Step S405 the communication device 301 transmits the image plane difference adjustment lens data H1h, H1v, H2h, ..., H9v to the body 1, and then the flow goes to Step S406, where the external unit 300 completes the operation.

FIG. 19 shows a flowchart of the operation in the arrangement with addition of the external unit 300 in which a micon serves as the lens communication device 33 of lens 2. Since the operation is the same as described with the flowchart, the details thereof are omitted to explain herein.

Although in the above description the image plane difference adjustment lens data H1h, H1v, H2h, ..., H9v at specific focus detection positions on screen corresponding to the focus detectors 11–19 is read for correction from the lens and written into the lens, the adjustment lens data may be formed by expressing an image plane difference at a general position on screen.

Figure 13:
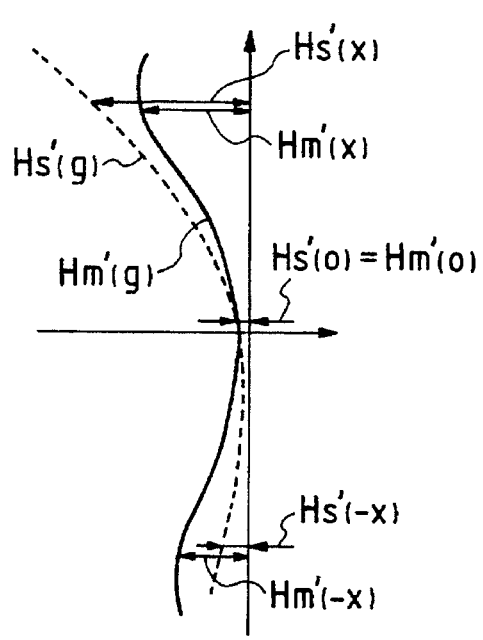
FIG. 13 is a drawing to illustrate that a difference between focus detection image plane and best image plane varies with each individual lens.
Figure 12:
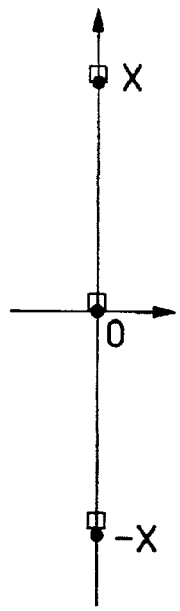
FIG. 12 is a drawing to illustrate a position of image plane in an example in which a difference between focus detection image plane and best image plane is corrected depending upon a focus detection direction and an image height.
Figure 14:
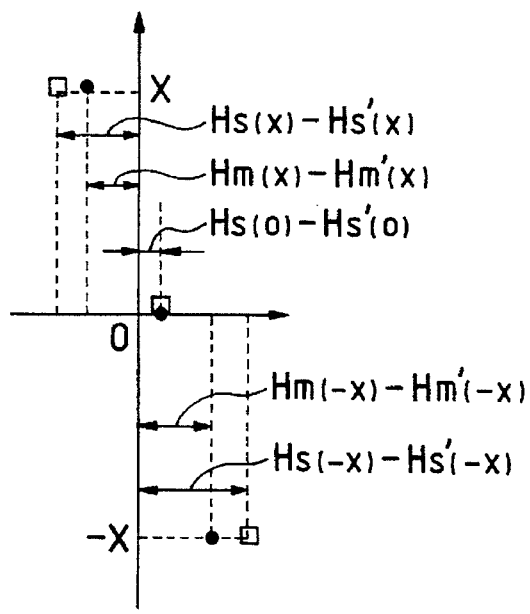
FIG. 14 is a drawing to illustrate that a difference between focus detection image plane and best image plane causes an error to a designed value because of the lens individual variation.
Figure 17:
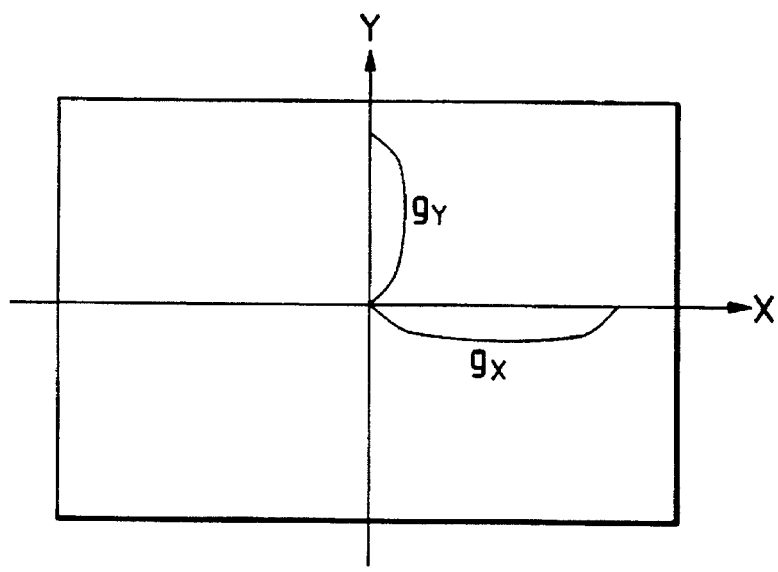
FIG. 17 is a drawing to show the convention of the X and Y directions on a screen.

For example, alternative image plane difference adjustment lens data may be determined as follows. The image plane differences Hm' (g) and Hs' (g) in FIG. 13 are obtained in two directions, that is, in the horizontal direction x and the vertical direction y passing through the optical axis at the screen center as shown in FIG. 17, to obtain image plane differences Hmx' (g), Hs'x (g), Hmy' (g) and Hsy' (g). A polynomial is obtained by expanding each image plane difference with respect to distance g. Coefficients in the polynomials may be employed as the image plane difference adjustment lens data. The polynomials are given by following Equation 1 and Equation 2.

$$Hmx'(g)=K0+K2*g2+K*g3+Hsx'(g)=L0+L1*g+L2*g2+L3*g3+ \quad (1)$$

$$Hmy'(g)=M0+M1*g+M2g2+M3*g3+Hsy'(g)=N0+N1*g+N2*g2+N3g3+ \quad (2)$$

Coefficients K0, K1, K2, ..., L0, L1, ..., M0, M1, ..., N0, N1, ... are written as the image plane difference adjustment lens data in the EEPROM 32 on the lens side.

Defocus amounts are corrected by using this image plane difference adjustment lens data as follows. As for the focus detectors 11, 14, 17 located on the x axis in FIG. 16, a correction amount is calculated by putting a distance from the optical axis center to each focus detection position into Equation 1. As for the focus detectors 11, 12, 13 located on the y axis, a correction amount is calculated by putting a distance from the optical axis center to each focus detection position into Equation 2.

For each of the photodetectors 15, 16, 18, 19 away from the x axis and the y axis, normal lines to the x axis and to the y axis through each focus detection position intersect with the x axis and with the y axis at distances gx, gy to the screen center, one distance gx is put into Equation 1 and the other distance gy into Equation 2, and an average is calculated with weighting factors which are absolute values of the distances gx, gy, whereby two correction amounts are obtained.

Upon calculation of image plane difference adjustment lens data, the coefficients K0, K1, K2, K3, ... may be determined as to minimize a sum of errors between defocus amounts d1h, d4h, d7h of focus detectors 11, 14, 17 on the x axis obtained in setting of FIG. 15 and defocus amounts d1h, d4h, d7h calculated from the image plane difference function Hmx' (g) at respective distances of the focus detection positions from the screen center.

Similarly, coefficients L0, L1, L2, L3, ... in image plane difference function Hsx' (g) may be determined from defocus amounts d1v, d4v, d7v of focus detectors 11, 14, 17 on the x axis, coefficients M0, M1, M2, M3, ... in image plane difference function Hmy' (g) from defocus amounts d1v, d2v, d3v of focus detectors 11, 12, 13 on the y axis, and coefficients N0, N1, N2, N3, ... in image plane difference function Hsy' (g) from defocus amounts d1h, d2h, d3h of focus detectors 11, 12, 13 on the y axis. These coefficients are determined on the body side and sent to the lens side to be written in EEPROM 32.

By expressing the image plane difference in the form of function with a variable of distance from the screen center as described, the same image plane difference adjustment lens data will do for bodies having different focus detection positions, enhancing the flexibility of system.

Initial values of the image plane difference adjustment lens data may be designed values, or measured values of image plane difference measured by a dedicated measuring instrument upon completion of lens assembly, which are stored in memory.

As described above, the image plane difference adjustment lens data is measured at a specific setting distance or at a focal length and the data is stored in memory. The lens data may be measured at a plurality of setting distances or at a plurality of focal lengths and stored in correspondence with the respective setting distances or focal lengths. Then, the image plane difference adjustment lens data is read out upon correction in correspondence with a setting distance or a focal length at the moment and the correction is made based on the read data. Alternatively, the lens data may be obtained by interpolation of adjustment data at two distances or focal lengths on either side of a setting distance or focal length.

In case that the lens is rotated in focusing or in zooming, the rotation could change the eccentricity or the tilt of lens. Thus, the correction or the interpolation may be carried out using image plane difference adjustment data which was measured and stored for each rotational position of lens (for example for each 90 degrees).

Although in the present embodiment as described the image plane difference adjustment lens data is stored only in EEPROM 32, the data storage may be arranged such that the lens data of designed values of image plane difference is fixedly stored in ROM 31 while only errors of image plane difference to the designed values intrinsic to the photographic optical system 3 are stored in EEPROM 32. Such an arrangement can be applicable to the system as shown in the structure of FIG. 2.

Although the above embodiment is so arranged that if there are individual variations of optical properties of interchangeable lens, data related to the optical properties for each interchangeable lens is stored and the focus detection result is corrected by the data, the data may be used for correction of metering value, as described below.

First described is the operation executed when the normal mode is set by the adjustment mode setting device 42.

In FIG. 5, a luminance distribution of subject on screen is measured with a beam passing through the photographic optical system 3 in interchangeable lens 2 by the metering device 25 to produce luminance distribution metering values Lij ($i=1-m$; $j=1-n$). The metering device 25 is provided with a two-dimensional sensor having m photodetectors in the horizontal direction and n photodetectors in the vertical direction. A luminance distribution metering value Lij represents an output of each photodetector.

The EEPROM 32 stores metering correction values Sij ($i=1-m$; $j=1-n$). The lens communication device 33 reads the metering correction values Sij ($i=1-m$; $j=1-n$) from EEPROM 32 to transmit the lens data to the body communication device 41 through the lens side communication terminal 34 and the body side communication terminal 44, and the body communication device 41 transmits the lens data to the metering value correction device 26.

The metering value correction device 26 corrects the luminarice distribution metering values Lij ($i=1-m$; $j=1-n$) detected by the metering device 25 by the metering correction values Sij ($i=1-m$; $j=1-n$) to produce corrected luminance distribution metering values Lij ($i=1-m$; $j=1-n$)=Lijx as the above metering correction values SiJ.

Next described is the operation executed when the adjustment mode is set by the adjustment mode setting device 42.

In the adjustment mode, the interchangeable lens 2 is mounted on the camera body I as to observe a subject of uniform predetermined luminance Lv.

In this state, the luminarice distribution metering values Bij ($i=1-m$; $j=1-n$) detected by the metering device 25 are sent to the adjustment calculation device 43, which calculates metering correction values Sij ($i=1-m$; $j=1-n$)=Bv/Bij. Constant Bv represents a metering value corresponding to the predetermined luminance Lv.

The adjustment calculation device 43 sends the thus calculated metering correction values Sij ($i=1-m$; $j=1-n$) to the body communication device 41, and the body communication device 41 transmits the lens data to the lens communication device 33 through the body side communication terminal 44 and the lens side communication terminal 34. The lens communication device 33 writes the metering correction values Sij in EEPROM 32.

According to the present invention as described, metering or focus detection can be completed without errors even with individual variations of interchangeable lens, and mechanical adjustment for canceling the variations may be omitted. Even if the optical properties of interchangeable lens are changed with time, re-adjustment is easy. Further, the writing of lens data is performed by communication through the lens communication terminal, requiring no extra terminal.

Also, the re-adjustment can be done while the interchangeable lens is mounted on the body, requiring no extra apparatus for adjustment and enabling easy re-adjustment.

Further, the individual variations and changes with time of the metering device and the focus detection device on the body side can be absorbed as well as the changes with time in optical properties of interchangeable lens. Then, if a specific body is constantly used, adjustment optimized for the body can be effected. Further, re-adjustment is easy when the body is replaced by another.

What is claimed is:

1. An interchangeable lens camera system comprising:

an interchangeable lens comprising:

a photographic optical system, a lens mount to mount the interchangeable lens, a lens side communication terminal to communicate to and from the interchangeable lens, a storage circuit to store lens data representing an optical property of said photographic optical system of said interchangeable lens without a supply of external power, said lens data being electrically erasable or rewritable, and a lens side communication device to transmit the lens data stored in said storage circuit through said lens side communication terminal; and a camera body comprising:

a body mount engageable with said lens mount to mount said interchangeable lens on said camera body, a sensor to receive light from a field through said photographic optical system and to generate an output corresponding to the light received, when said interchangeable lens is mounted on the camera body by said body mount, a processing circuit to process the output generated from said sensor and to output a condition signal, based on the processed output, indicating a focus or photometry condition of a subject image formed by said photographic optical system, a body side communication terminal connected to said lens side communication terminal to communicate with said lens side communication terminal, when said interchangeable lens is mounted on the camera body by said body mount, a body side communication device to communicate with said lens side communication device, through said body side communication terminal and said lens side communication terminal, to receive said lens data transmitted from said lens side communication device, and a correction circuit to receive said condition signal from said processing circuit and said lens data from said body side communication device, and to correct said condition signal based on said lens data thereby to correct a focus or photometry value of said subject image.

2. A camera system according to claim 1, wherein said storage circuit is arranged such that said lens data is electrically erasable and writable, wherein said camera body further comprises an adjustment mode setting device to set an adjustment mode to make said camera body execute an adjustment operation different from a normal operation, and an adjustment data calculation device to process the light received from said sensor when said interchangeable lens is mounted and thereby to produce adjustment data intrinsic to the mounted interchangeable lens, wherein when said adjustment mode is set, said body side communication device transmits said adjustment data to said lens side communication device through said body side communication terminal and said lens side communication terminal, and wherein said lens side communication device receives said adjustment data transmitted thereto and writes said adjustment data as lens data in said storage circuit.

3. A camera system according to claim 1, wherein said storage circuit is electrically erasable and writable;

wherein said camera body further comprises an external communication terminal;

wherein said camera system further comprises an external unit, said external unit comprising:
- a unit side communication terminal connectable with said external communication terminal,
- a unit side communication device capable of communicating with said body side communication device through said external communication terminal and said unit side communication terminal to receive an output of said sensor from said body side communication device, and
- an adjustment data calculating circuit to process the output of said sensor to produce adjustment data intrinsic to the mounted interchangeable lens;

wherein said unit side communication device transmits said adjustment data to said body side communication device through said external communication terminal and said unit side communication terminal;

wherein said body side communication device transmits said adjustment data to said lens side communication device through said body side communication terminal and said lens side communication terminal; and wherein said lens side communication device receives said adjustment data transmitted thereto and writes the received adjustment data as lens data in storage in said storage circuit.

4. A camera system according to claim 1, wherein said processing circuit provided in said camera body is a focus detection device to detect a defocus amount of an imaging plane along the optical axis to a predetermined plane in said photographic optical system and said lens data is an adjustment amount along the optical axis to correct said defocus amount.

5. A camera system according to claim 1, wherein said processing circuit is a focus detection device to detect a defocus amount of an imaging plane along the optical axis to a predetermined plane of said photographic optical system at a plurality of positions in screen and said lens data comprises a plurality of data pieces for said plurality of positions in screen, each including an adjustment amount along the optical axis to correct said defocus amount.

6. An interchangeable lens camera system comprising:

an interchangeable lens comprising:
- a photographic optical system,
- a lens mount to mount the interchangeable lens,
- a lens side communication terminal to communicate to and from the interchangeable lens,
- a first storage circuit to store first lens data representing an optical property of said photographic optical system of said interchangeable lens in an unrewritable manner,
- a second storage circuit to store second lens data used to adjust a variation of the optical property of said photographic optical system of said interchangeable lens without a supply of external power, and
- a lens side communication device to transmit said first and second lens data stored in said first and second storage circuit, respectively, through said lens side communication terminal; and a camera body comprising:
- a body mount engageable with said lens mount to mount said interchangeable lens on said camera body,
- a sensor to receive light from a field through said photographic optical system and to generate an output corresponding to the light received, when said interchangeable lens is mounted on the camera body by said body mount,
- a processing circuit to process the output generated from said sensor and to output a condition signal, based on the processed output, indicating a condition of a subject image formed by said photographic optical system,
- a body side communication terminal connected to said lens side communication terminal to communicate with said lens side communication terminal, when said interchangeable lens is mounted on the camera body by said body mount,
- a body side communication device to communicate with said lens side communication device, through said body side communication terminal and said lens side communication terminal, to receive said first and second lens data transmitted from said lens side communication device, and
- a correction device to receive said condition signal from said processing circuit and said first and second lens data from said body side communication device, and to correct said condition signal based on said first and second lens data.

7. A camera system according to claim 6, wherein said second storage circuit is arranged such that the lens data is electrically erasable and writable, wherein said camera body further comprises an adjustment mode setting device to set an adjustment mode to make said camera body execute an adjustment operation different from a normal operation, and an adjustment data calculation device to process the light received from said sensor when said interchangeable lens is mounted and thereby to produce adjustment data intrinsic to the mounted interchangeable lens, wherein when said adjustment mode is set, said body side communication device transmits said adjustment data to said lens side communication device through said body side communication terminal and said lens side communication terminal, and wherein said lens side communication device receives said adjustment data transmitted thereto and writes said adjustment data as second lens data in said second storage circuit.

8. A camera system according to claim 6, wherein said second storage device is electrically erasable and writable;

wherein said camera body further comprises an external communication terminal;

wherein said camera system further comprises an external unit, said external unit comprising:
- a unit side communication terminal connectable with said external communication terminal,
- a unit side communication device capable of communicating with said body side communication device through said external communication terminal and said unit side communication terminal to receive an output of said sensor from said body side communication device, and an adjustment data calculating circuit to process the output of said sensor to produce adjustment data intrinsic to the mounted interchangeable lens;

wherein said unit side communication device transmits said adjustment data to said body side communication device through said external communication terminal and said unit side communication terminal;

wherein said body side communication device transmits said adjustment data to said lens side communication device through said body side communication terminal and said lens side communication terminal; and wherein said lens side communication device receives said adjustment data transmitted thereto and writes the received adjustment data as second lens data in storage in said second storage device.

9. A camera system according to claim 6, wherein said processing circuit provided in said camera body is a focus detection device to detect a defocus amount of an imaging plane along the optical axis to a predetermined plane in said photographic optical system and said second lens data is an adjustment amount along the optical axis to correct said defocus amount.

10. A camera system according to claim 6, wherein said processing circuit is focus detection device to detect a defocus amount of an imaging plane along the optical axis to a predetermined plane of said photographic optical system at a plurality of positions in screen and said second lens data comprises a plurality of data pieces for said plurality of positions in screen, each including an adjustment amount along the optical axis to correct said defocus amount.

11. An interchangeable lens assembly, detachably mountable to a camera body which comprises an intended focal plane, a body mount, a body communication terminal, a focus detection device to detect a focus adjustment condition through a photographic optical system in a lens mounted to said body mount to calculate a defocus amount of an image plane of a photographic optical system to the intended focal plane, and a correction circuit to correct said defocus amount, comprising:

a photographic lens optical system forming a subject image on the intended focal plane in said camera body;

a storage circuit to store lens data without a supply of external power, said lens data including data representing an optical property intrinsic to the photographic optical system of said interchangeable lens assembly,. said lens data being electrically erasable or rewritable;

a lens communication terminal connected to said body communication terminal when said lens is mounted on said camera body; and a lens communication device to transmit the lens data stored in said storage circuit to the correction circuit of said camera body through said lens communication terminal and said body communication terminal when the lens is mounted on said camera body, said correction circuit of the camera body adjusting said defocus amount based on the lens data transmitted thereto.

12. An interchangeable lens assembly according to claim 11, wherein said storage circuit stores as said lens data, information on a property of said photographic lens optical system at least at a position off the optical axis thereof.

13. A focus detection system comprising a camera body and an interchangeable lens assembly, said camera body comprising:
an intended focal plane on which a subject image is focused,
a body mount to mount a lens,
a body communication terminal connectable with another communication terminal,
a focus detection device to detect a focus adjustment condition through a photographic optical system in a lens mounted to said body mount to calculate a defocus amount of an image plane of a photographic optical system to an intended focal plane, and
a correction circuit to correct said defocus amount; and said interchangeable lens assembly comprising:
a photographic lens optical system for forming a subject image on the intended focal plane in said camera body,
a storage circuit to store lens data without a supply of external power, said lens data including data representing an optical property intrinsic to the photographic lens optical system of said interchangeable lens, which is used to correct said defocus amount, said lens data being electrically erasable or rewritable,
a lens communication terminal connectable with said body communication terminal when the lens is mounted on said camera body, and
a lens communication device to transmit the lens data stored in said storage circuit to the correction circuit of said camera body through said lens communication terminal and said body communication terminal when the lens is mounted on said camera body, said correction circuit correcting said defocus amount based on the lens data transmitted thereto.

14. A focus detection system according to claim 13, wherein said focus detection device performs focus detection at least at a position off the optical axis of said photographic lens optical system to calculate a defocus amount and wherein said storage circuit stores as said lens data information on an optical property at least at the position off the optical axis of said photographic lens optical system.

15. An interchangeable lens assembly, detachably mountable to a camera body which comprises an intended focal plane, a body mount, a body communication terminal and a correction circuit, comprising:

a photographic lens optical system forming a subject image on the intended focal plane in said camera body;

a storage circuit to store lens data without a supply of external power, said lens data including data representing an optical property intrinsic to the photographic optical system of said interchangeable lens, said lens data being electrically erasable or rewritable;

a lens communication terminal connected to said body communication terminal when said lens is mounted on said camera body; and a lens communication device to transmit the lens data stored in said storage circuit to the correction circuit of said camera body through said lens communication terminal and said body communication terminal when the lens is mounted on said camera body, said correction circuit to correct a focus or photometry value of said subject image based on said lens data.

16. An interchangeable lens assembly, detachably mountable to a camera body which comprises an intended focal plane and a body mount, comprising:

a photographic lens optical system forming a subject image on the intended focal plane in said camera body;

a storage circuit to store lens data without a supply of external power, said lens data including data representing an optical property intrinsic to the photographic optical system of said interchangeable lens, said lens data being electrically erasable or rewritable;

a device to determine the lens data in accordance with a characteristic of said photographic lens optical system measured when a lens is assembled; and a correction circuit of said camera body to correct a focus or photomerry value of said subject image based on said lens data.

17. A focus detection system comprising a camera body and an interchangeable lens assembly, said lens assembly comprising:

a photographic lens optical system to form an object image, and an electric erasable and programmable read only memory to store lens data of an off-axis aberration property intrinsic to said photographic lens optical system of the interchangeable lens without a supply of external power, said camera body comprising:

a focus detecting device to detect a defocus amount of said object image in an off-axis position, and a correcting circuit to correct said defocus amount based upon said lens data stored in said electric erasable and programmable read only memory.

18. A focus detection system comprising an interchangeable lens assembly, said lens assembly comprising:

a photographic lens optical system to form an object image, and an electric erasable and programmable read only memory for storing lens data of an off-axis aberration property intrinsic to said photographic lens optical system of the interchangeable lens without a supply of external power.

19. An interchangeable lens camera system comprising:

an interchangeable lens comprising:

a photographic optical system, a lens mount to mount the interchangeable lens, a lens side communication terminal to communicate to and from the interchangeable lens, a storage circuit to store lens data representing a manufacturing error or a time-lapsed variation error of said photographic optical system of said interchangeable lens without a supply of external power, and a lens side communication device to transmit the lens data stored in said storage circuit through said lens side communication terminal; and a camera body comprising:

a body mount engageable with said lens mount to mount said interchangeable lens on said camera body, a sensor to receive light from a field through said photographic optical system and to generate an output corresponding to the light received, when said interchangeable lens is mounted on the camera body by said body mount, a processing circuit to process the output generated from said sensor and to output a condition signal, based on the processed output, indicating a focus or photometry condition of a subject image formed by said photographic optical system, a body side communication terminal connected to said lens side communication terminal to communicate with said lens side communication terminal, when said interchangeable lens is mounted on the camera body by said body mount, a body side communication device to communicate with said lens side communication device, through said body side communication terminal and said lens side communication terminal, to receive said lens data transmitted from said lens side communication device, and a correction circuit to receive said condition signal from said processing circuit and said lens data from said body side communication device, and to correct said condition signal based on said lens data thereby to correct a focus or photometry value of said subject image.

* * * * *

UNITED STATES PATENT AND TRADEMARK OFFICE
CERTIFICATE OF CORRECTION

PATENT NO. : 5,630,180
DATED : May 13, 1997
INVENTOR(S) : Yosuke KUSAKA

It is certified that error appears in the above-identified patent and that said Letters Patent is hereby corrected as shown below:

On the Cover Page,
    Section [56] U.S. Patent Documents, "4,437,287 3/1984" should be --4,473,287 9/1984--.

Signed and Sealed this

Ninth Day of December, 1997

Attest:

BRUCE LEHMAN

*Attesting Officer*      *Commissioner of Patents and Trademarks*